May 28, 1940.  W. S. PRAEG  2,202,638
TESTING APPARATUS
Filed April 17, 1939  4 Sheets-Sheet 1

INVENTOR.
WALTER S. PRAEG
BY
ATTORNEYS

May 28, 1940. W. S. PRAEG 2,202,638
TESTING APPARATUS
Filed April 17, 1939 4 Sheets-Sheet 2

INVENTOR.
WALTER S. PRAEG
BY Whittemore, Hulbert & Belknap
ATTORNEYS

May 28, 1940.  W. S. PRAEG  2,202,638
TESTING APPARATUS
Filed April 17, 1939  4 Sheets-Sheet 3
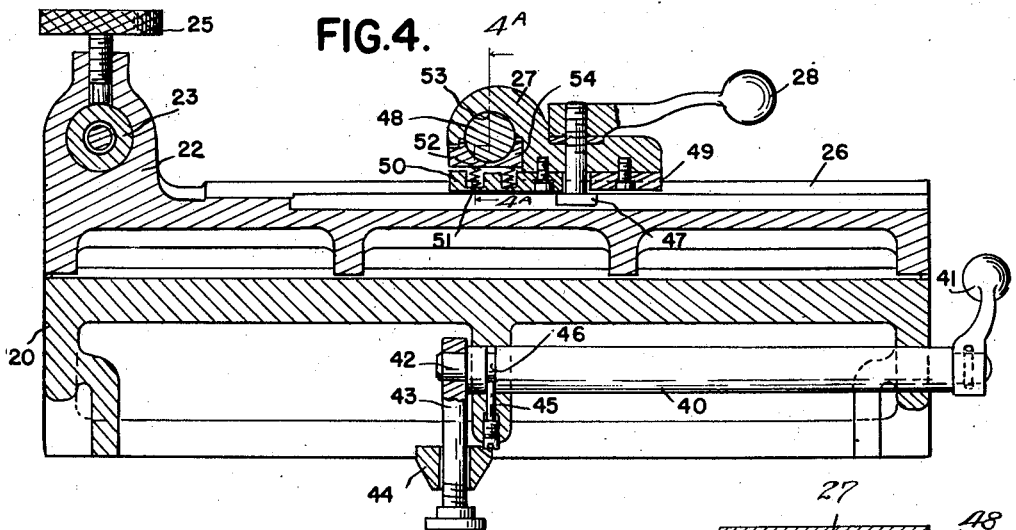
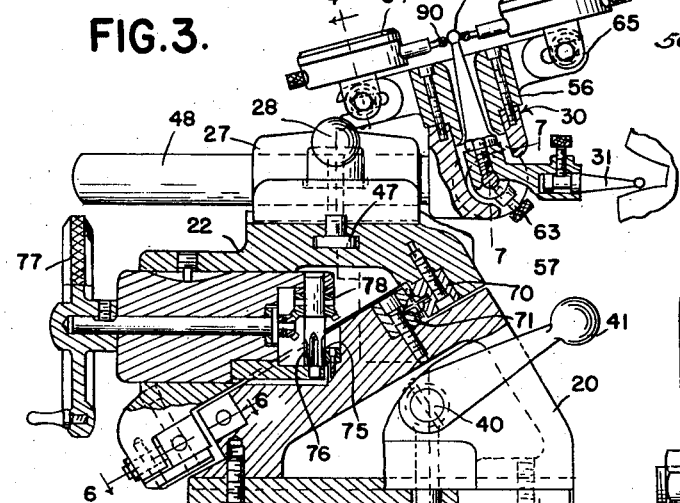
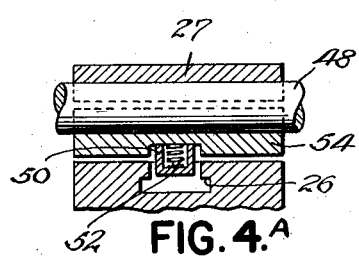
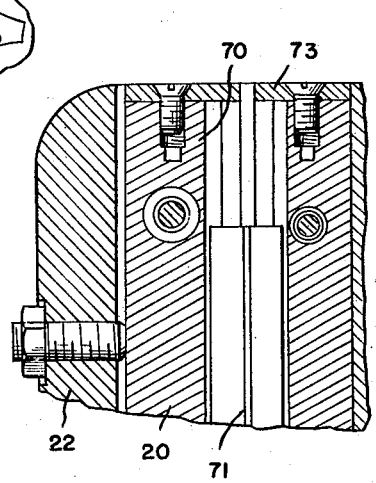
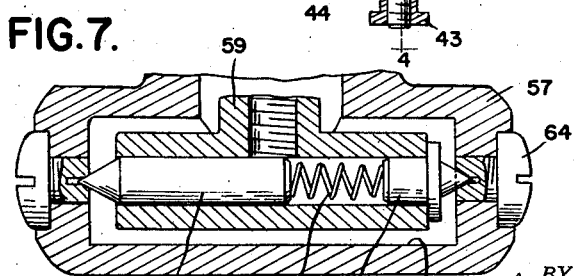
INVENTOR.
WALTER S. PRAEG
ATTORNEYS May 28, 1940.  W. S. PRAEG  2,202,638
TESTING APPARATUS
Filed April 17, 1939  4 Sheets-Sheet 4

INVENTOR.
WALTER S. PRAEG
BY
Whittemore Hulbert & Belknap
ATTORNEYS

Patented May 28, 1940

2,202,638

UNITED STATES PATENT OFFICE 2,202,638

TESTING APPARATUS

Walter S. Praeg, Detroit, Mich., assignor to National Broach & Machine Company, Detroit, Mich., a corporation of Michigan Application April 17, 1939, Serial No. 268,413

17 Claims. (Cl. 33—174)

The present invention relates to testing apparatus and more particularly to a lead checker adapted to accurately measure the lead on gears and the amount of crowning on gears.

The manufacture of gears with cut teeth has developed in the last fifteen years from an entire dependence upon the machine operator to a coordination of effort on the part of the operator and the men in a gear laboratory; this laboratory being equipped with the most sensitive measuring equipment available for measuring elements of gear teeth. In all gears it is necessary that the teeth bear a proper relationship to the axis of the gear. In spur gears the teeth must be paralleled in all planes with the axis of the gear. In helical or spiral gears the teeth must have a uniform helical advance around the axis of the gear, one complete revolution of helical advance being known as the lead of the gear. The angular relationship of the pitch line on the gear to its axis is known as its helix angle.

A number of different designs of lead measuring machines are available, all of which are complicated in mechanism and slow to set up and operate. This does not offer any serious difficulty when only one piece is to be measured. When it is necessary to measure leads on a number of pieces the time consumed to do this work becomes a serious factor.

A very satisfactory way to measure lead is to check a lead against a known lead. This is accomplished very simply by the apparatus disclosed in the present application.

Briefly described, a master element, which may be in the form of a gear or a cylindrical element having one or more helical slots of known angle formed therein, is mounted to be rotated with the gear to be tested. A movable assembly comprising a relatively fixedly mounted tip to engage the master element and a movable tip to engage a tooth of the gear being tested is provided. As relative translation between the master element and the gear on the one hand and the tips referred to on the other hand takes place, movement of the movable tip indicates deviation between the angle of the tooth being measured and the corresponding surface of the master element.

It is accordingly an object of the present invention to provide a measuring apparatus for measuring angles or crowning of gear teeth.

It is a further object of the present invention to provide apparatus of the character described, characterized by its extreme simplicity and by its efficiency and rapidity in operation.

It is a further object of the present invention to provide testing apparatus of the character described embodying numerous improved elements of design.

Other objects of the invention will be apparent as the description proceeds, and when taken in conjunction with the accompanying drawings wherein:

Figure 3 is a fragmentary vertical section through the carriage of my apparatus;

Figure 4 is a section on the line 4—4, Figure 3;

Figure 4A is a section on the line 4A—4A, Figure 4;

Figure 6 is an enlarged fragmentary section on the line 6—6, Figure 3;

Figure 7 is an enlarged fragmentary section on the line 7—7, Figure 3;

Figure 1:
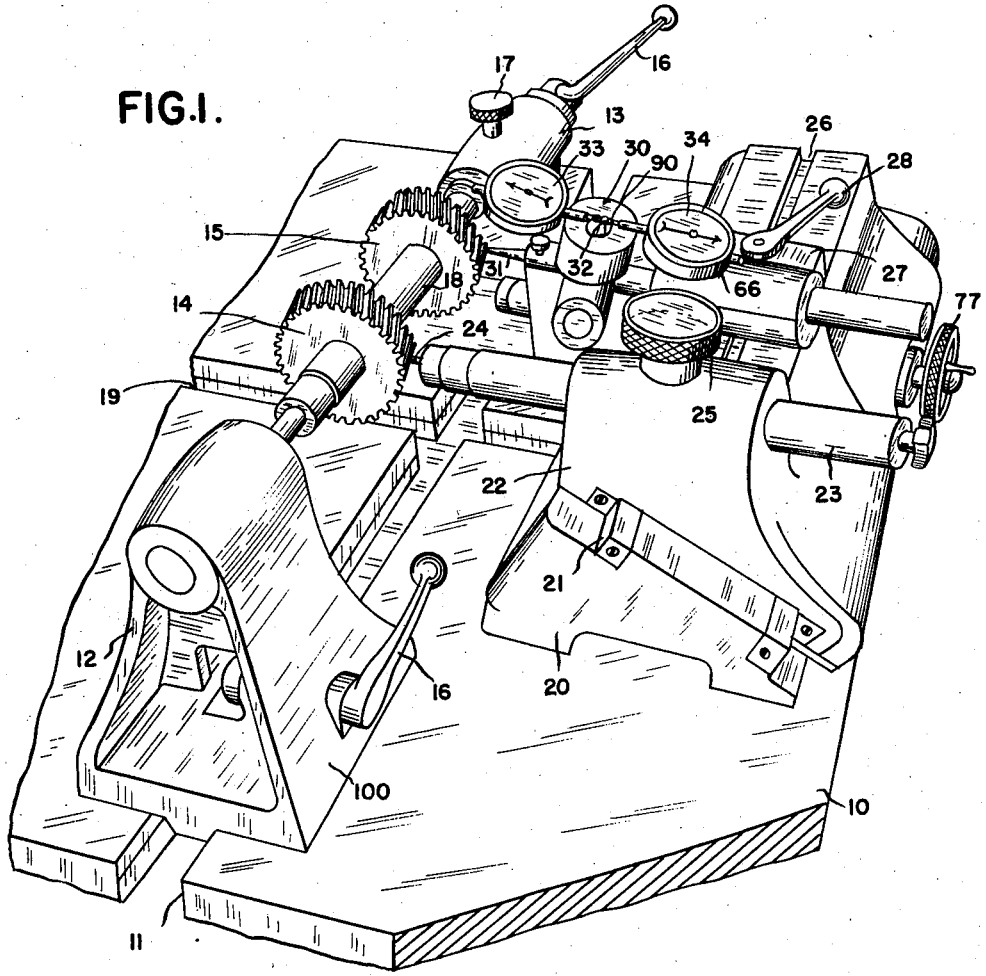
Figure 1 is a perspective of my improved apparatus.

Referring to Figure 1, the apparatus comprises a table 10 provided with ways 11 along which are adjustably mounted in clamping relation a pair of stocks 12 and 13 for receiving therebetween in rotatable relation a master element 14 and a gear or other article to be tested 15. Suitable clamping means indicated at 16 are provided, and in addition a spindle lock nut 17 is carried by the stock 13. The master element 14 and the gear 15 are retained in non-rotatable relation on an arbor 10, which in turn is mounted for free rotation between the stocks 12 and 13.

Carried by the table 10 and adjustable thereon in ways 19 toward and away from the spindle 18 is a pedestal 20 provided with suitable guiding ways indicated generally at 21. Mounted on the ways is a carriage 22 which supports a contact member 23 carrying a contact element 24 adapted to engage a tooth of the guiding element 14. Member 23 is adjustable toward and away from the master element 14 and is adapted to be locked in adjusted position by a clamping screw or the like 25.

The carriage 22 is provided with ways 26 on which is mounted an indicator support 27. The indicator support is adjustable toward and away from the contact member 23 and is adapted to be locked in adjusted position by suitable clamping means provided with a manually operable handle 28. Carried by the indicator support 27 is an indicator mounting 30, best shown in Figure 3. A measuring pointer 31 is movably mounted on the indicator and is adapted when moved to move an indicator actuator 32. This actuator is adapted to engage one of the indicators 33 or 34 which in turn give a direct reading of the deviation between the angularity of the surface being measured and the angularity of the corresponding surface of the master element 14.

Referring now to Figures 4 and 4A, the pedestal 20 is provided with locking means comprising a shaft 40 carrying a lock handle 41 and an eccentric 42 which in turn is associated with a locking pin 43 adapted to actuate the clamp 44, movable in the ways 19 previously referred to. The shaft 40 is retained against axial movement by a lock screw 45 movable in a circumferential groove 46. This arrangement provides for movement of the pedestal 20 bodily toward and away from the ways 11 and for rigidly retaining the pedestal in adjusted position. The indicator support 27, as shown in Figure 4, is movable toward and away from the contact member 23 along ways 26 and is adapted to be clamped in adjusted position by means of a clamp 47 cooperating with a locking member 28. The indicator support 27 is provided with clamping means to carry a rod 48 which supports the indicator mounting 30. The indicator support 27 is provided with a rigidly supported guiding plate 49 bolted thereto and having a key movable in the ways 26. In addition a second key 50 is bolted to the underside of the indicator support 27 and is provided with a pair of recesses 51 which receive compression springs 52. The indicator support 27 is provided with a half-round recess 53 for receiving the rod 48, and a second plate 54 is provided, also formed to provide a half-round recess for the rod. Springs 52 urge the plate 54 resiliently toward the indicator support and serve to clamp the rod 48 resiliently therebetween upon release of the clamping member 28. The spring compression is sufficient to prevent accidental rotation of the rod 48 with possible consequent damage to the sensitive indicator carried thereby. When clamp 47 is tightened plate 54 firmly locks rod 48 in adjusted position at the same time as it locks indicator support 27 in adjusted position in ways 26.

Figure 2:
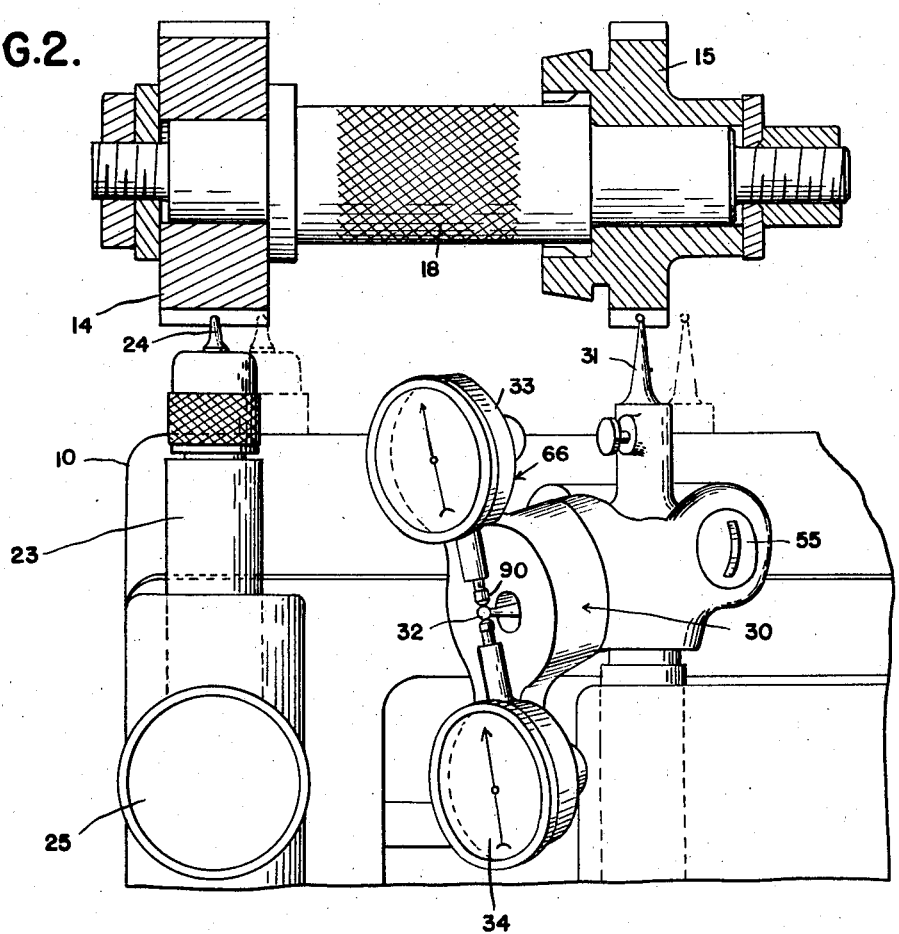
Figure 2 is an enlarged detail plan view showing the cooperating elements.

Referring now particularly to Figure 3, the indicator support and mounting is shown in detail. The indicator mounting 30 is clamped on the rod 48 as by a clamp screw or the like 55 (Figure 2). This arrangement permits adjustment about the axis of rod 48 to position the axis of lever 59 generally parallel to the surface being measured. The indicator mounting comprises a centrally apertured member 56 bolted or otherwise secured to a lower housing member 57. The housing member 57 is shown in detail in Figure 7 and is provided with a recess 58 for pivotally supporting a lever 59 which carries the measuring pointer 31 and the indicator actuator 32. Preferably, in order that this lever shall be freely supported with a constant force applied thereto, it is provided with a pair of spring pressed centers 60 and 61, the spring being shown in Figure 7 and indicated at 62. The center 60 may be locked in adjusted position by a set screw 63, shown in Figure 3, centering bolts 64 being provided in the housing 57.

As shown in Figure 3, the indicator actuator 32 passes upwardly through the central aperture referred to in the member 56 and clearance is provided for movement of the actuator 32. The member 56 is provided with a pair of diametrically oppositely extending slotted ears 65 to which may be bolted indicators 66, which may be of conventional design.

In order to provide for free movement of the carriage 22 the ways 21 comprise removable ball bearing races 70 and a cooperating cage 71 containing ball bearings. The cage is shorter than the races 70, as indicated in Figure 6, and stop plates such as indicated at 73 are provided, with the result that the cage is substantially self-centering.

Means are provided for translating the carriage 22 along the pedestal 20 and takes the form of a rack 75 bolted to the pedestal 20. The carriage 22 has mounted therein a pinion 76, shown in Figure 3, which is in constant mesh with the rack 75. A handwheel 77 is provided and is adapted to rotate the gear 76 through suitable cooperating bevel gears indicated at 78. As will be evident, rotation of the handwheel results in a relatively slow controlled translation of the carriage 22.

Figure 5:
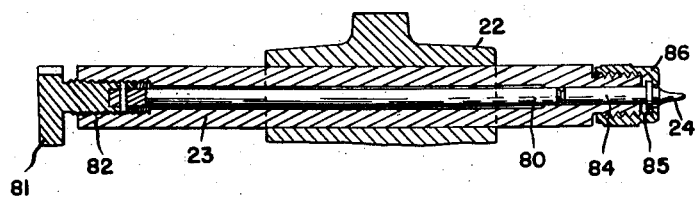
Figure 5 is a detail section of a contact element.

Referring now to Figure 5, I have illustrated in detail the arrangement of the contact member 23, which is slidably received in the correspondingly formed aperture in the carriage 22. The member 23 may be clamped in adjusted position, as previously referred to, by the member 25. The contact member 23 is tubular and is adapted to receive slidable rod 80 which is connected to a threaded member 81 for movement therewith. Member 81 is threadedly received within the tubular member 23, the screw blades being indicated at 82.

The contact element 24, which is adapted to engage the guiding surface of the master element 14, is integrally formed on a short rod section 84 and is likewise slidable in the bore of the tubular member 23. A flange 85 is formed thereon and is adapted to cooperate with a cap member 86 threadedly received on one end of the member 23. The relationship is such that upon loosening the cap member 86 the contact element 24 may be adjusted toward or away from the master element 14 by a suitable rotation of the member 81. The parts may be rigidly retained in adjusted position by screwing the cap 86 inwardly while retaining member 81 against rotation. By this means the contact element 24 may be brought into predetermined relation with the guide surface.

Figure 10:
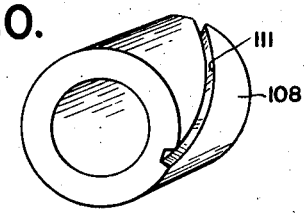
Figure 10 is a perspective of the master guiding element.
Figure 8:
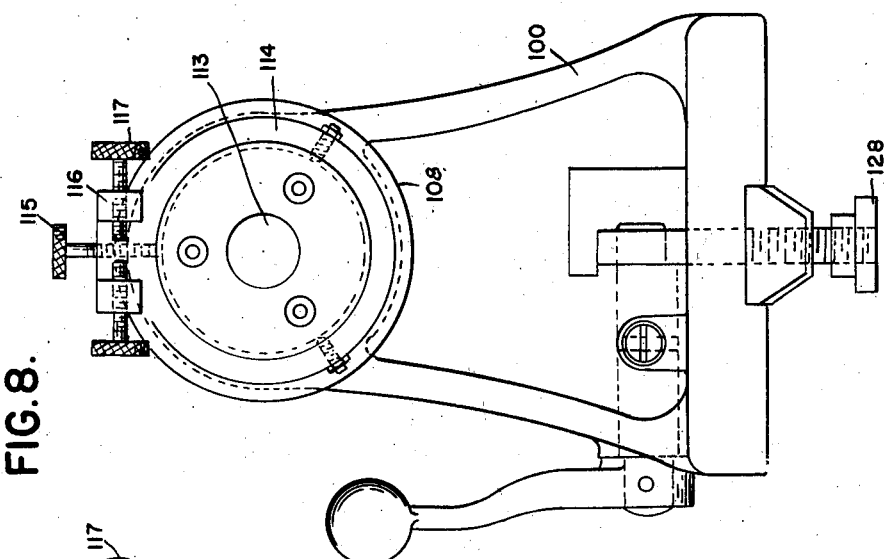
Figure 8 is a detail elevation of a modification employed for testing a gear provided with an integral shank.
Figure 9:
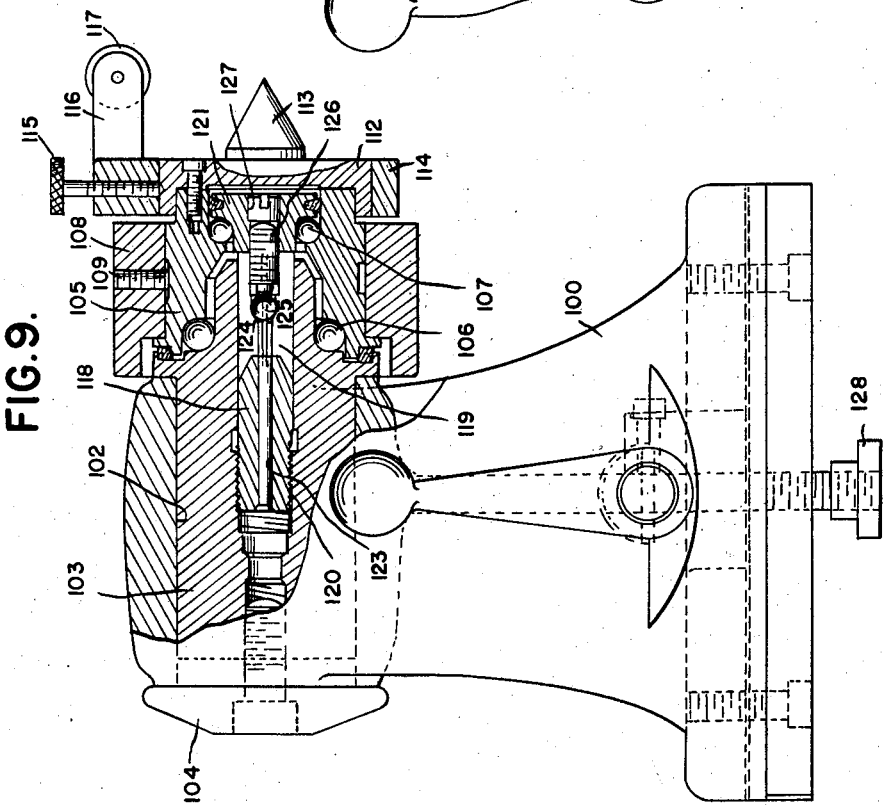
Figure 9 is a side elevation partly in section of the structure shown in Figure 8.

The mechanism just described is suitable for measuring gears which may be mounted upon the arbor 18 either directly or by means of suitable conventional adapters. In the event that the gear to be tested is formed integrally with a shaft, other provisions must be made. Mechanism for taking care of this situation is illustrated in Figures 8 to 10.

In these figures I have illustrated a head 100 which is adjustable toward and away from an oppositely disposed head. The work piece is adapted to be supported for rotation between the heads and to be rigidly retained for rotation with a master element 108. For this purpose the head 100 is provided with a central bore 102 in which is received a centrally apertured block 103 adapted to be rigidly clamped in the bore 102 by means of a cooperating nut 104, as clearly illustrated in Figure 9. Annular member 105 is mounted for rotation relative to the relatively fixed block 103, appropriate ball bearings indicated at 106 and 107 being provided for this purpose. Master element 108 is rotatably mounted on the annular member 105 and is adapted to be clamped in adjusted position thereon by means of a clamping screw 109, or the like. Master element 108 is illustrated in detail in Figure 10 and has formed thereon one or more helical slots or grooves 111 which, as seen in this figure, may be of inwardly tapered cross-section. Accordingly, adjustment of contact element 24 inwardly or outwardly, as previously described, varies its clearance in the slot so that its clearance may be greater than the clearance between measuring pointer 31 and the surface which it engages. It will be understood that a plurality of helical slots 111 may be provided, each extending at a different helix angle to the axis of the member 108. A plate 112 is bolted to the annular member 105, a rigid center 113 being formed or secured on the forward face of the plate 112. A driving member 114 is rotatably mounted about plate 112 and is adapted to be clamped thereto in adjusted position by a set screw 115. Formed on the forward face of the annular member 114 are a pair of projections 116, each provided with a set screw 117 which functions to receive a driving connection rigidly secured to the gear being tested.

In order to obtain a rigid assembly, an expanding adapter 118 is provided in the correspondingly formed central passage through the block 103. The adapter 118, as indicated at 119, is slotted by a pair of diametrically opposite slots extending completely through the adapter. The adapter 118 is threaded as indicated at 120 and as clearly shown in Figure 9 the arrangement is such that the headed portion 121 of the adapter 118 retains the relatively rotary portions of the assembly in position. Also as shown in the figure, the headed portion 121 cooperates with the suitably formed portion of the member 105 to form a race for the ball bearings 107. The adapter 118 is centrally apertured as indicated at 123, and this central aperture has a tapered portion 124 adapted to cooperate with a wedging ball 125. A socket set screw 126 is threaded into the passage 123, as indicated in Figure 9, and as will be apparent is adapted to force the ball 125 against the conical surface 124. This expands the adapter 118 at its slotted portion and provides for an extremely rigid relationship between the adapter 118 and the block 103. Preferably and as indicated in Figure 9, the adapter 118 is provided with a recess 127 formed to receive a screw driver, or the like, for assembly.

In this device as in the modification previously described, clamping means 128 are provided for clamping the head 100 in adjusted position in the ways 11.

From the foregoing detailed description the operation of my improved construction will be readily apparent. The heads 13 and 12 or 100 may be adjusted along the ways 11 to accommodate any convenient length of device to be tested within the limits of the machine. In a like manner the pedestal 20 may be adjusted toward and away from the ways 11 to accommodate any diameter of device to be tested within the limits of the machine. In like manner the indicator support 27 may be adjusted relative to the carriage 22 to provide for any convenient spacing between the contact element 24 and the measuring pointer 31. In like manner both the indicator mounting 30 and the contact member 23 may be relatively adjusted toward and away from the device being measured or the master element to accommodate different diameter parts. It will thus be seen that the device is extremely flexible and within the limits of the machine may be adjusted to take care of a wide variety of parts.

Referring more particularly to Figure 3, it will be noted that in the preferred form a pair of indicating devices 33 and 34 are provided. Preferably clearance is provided between the indicator actuator 32 and the cooperating portion of the indicator so that the indicator actuator 32 will cooperate with but one of the indicators. This arrangement permits measurement of either side of a tooth space without further adjustment of the apparatus. As is well understood, indicators of the type shown have projecting elements 90 which are urged outwardly by spring means. By obtaining a suitable relative adjustment between the master element 14 and the gear or other element being measured, it is possible to provide an initial contact between the indicator actuator 32 and either of the spring pressed elements 90. The spring which urges the element 90 into engagement with the indicator actuator 32 also biases the lever 59 to retain the measuring pointer 31 in contact with the surface being measured.

The parts may be adjusted to the position indicated and the indicating pointer, if desired, set to zero. At this time rotation of the handwheel 77 may take place with a corresponding slow translation of the carriage 22 relative to the master element 14 and the work piece. If a helical element is being measured, and if the helical slot on the master element is engaged by the contact element 24, it will be apparent that this slow translation of the carriage 22 will result in a corresponding rotation of the master element 14. Since the master element 14 and the work piece, such as the gear 15, are rigidly mounted for simultaneous rotation, rotation of the master element will result in a corresponding rotation of the work piece. As long as the helical surfaces under consideration are inclined equally, there will be no motion of the measuring pointer 31 and consequently no movement of the pointer on the dial of the corresponding indicator. If, however, there is a difference between the angularity of the two helical surfaces under consideration, there will be a corresponding relative movement of the measuring pointer 31 which will be transformed to a corresponding indication on the dial of the indicator. Having due regard to the constants of the machine for any particular setting, this reading of the indicator may be translated directly into difference in angularity of the helical surfaces or irregularities therein, and the like.

It is desired to emphasize at this time another important function of the present apparatus. As is well understood, it is common practice today to employ crowned gears; that is, gears having teeth which are longitudinally bowed from end to end. Teeth of this type offer numerous important advantages over uncrowned teeth, and the field of their use is constantly increasing. The present apparatus provides a convenient means for measuring the crowning of gear teeth. This may be accomplished by two methods. It may be done by comparing a crowned gear tooth with a correspondingly crowned master element 14. If preferred, the master element 14 may be provided with an unmodified helical surface, in which case the desired crowning of the teeth of the work passage 15 would be indicated by a predetermined movement of the pointer on the corresponding indicator. The last method is in many ways preferred since the same master element may be employed for measuring or comparing variously crowned teeth having the same helix angle.

As I have indicated in the previously described drawings, the master element is provided with helical teeth or slots. It will be understood that the apparatus is adapted equally well to measure straight or spur teeth on a gear. In this case translation of the carriage 22 will not be accompanied by rotation of the master element 14, but any departure from parallelism in the teeth of the gear 15 will be at once evident from a corresponding movement of the pointer on the indicator in use. It will of course be obvious that in like manner crowning of spur teeth on the work piece 15 may be measured by comparing the surface of an unmodified spur tooth on the master element 14 or, if preferred, with a correspondingly crowned spur tooth on the master element 14.

Contact element 24 is preferably of such a size relative to the slot 111, or effective tooth space (where a master element such as 14, Figure 1, is employed) that more clearance exists therebetween than between measuring pointer 31, and the surfaces with which it engages. As a result, translation of the carriage in one direction will measure the surface of one tooth, and reverse translation will measure the adjacent surface of the next tooth. This greatly facilitates complete checking of a gear, and is an important feature of the present apparatus.

I have disclosed the present apparatus as particularly useful in measuring of gears, but it will be evident that its function is not so limited, and it is therefore intended to cover broadly apparatus adapted for measuring or comparing surfaces.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A comparator comprising a master element having a non-axial surface inclined to the axis thereof, means for rotatably mounting said element, means for supporting a work piece to be checked for rotation with said element, a member engaging said surface, means for relatively moving said element and member in a direction parallel to the axis of said element to rotate said element and said work piece, and movable measuring means operatively associated with said work piece and definitely positioned relative to said member for comparing a surface of the work piece with the said surface of the master element.

2. A comparator comprising a base, a master element having a non-axial surface inclined to the axis thereof, means for rotatably supporting said element on said base, means for supporting a work piece for rotation with said element, ways on said base parallel to the axis of said element, a carriage slidable on said ways, a member fixed on said carriage and engaging said surface, measuring means on said carriage operatively associated with said work piece, and means for moving said carriage in said ways.

3. A comparator comprising a base, a master element having a non-axial surface inclined to the axis thereof, means for rotatably supporting said element on said base, means for supporting a work piece for rotation with said element, ways on said base parallel to the axis of said element, a carriage slidable on said ways, a member fixed on said carriage and engaging said surface, measuring means on said carriage adjustable toward and from said member and operatively associated with said work piece, and means for moving said carriage in said ways.

4. A comparator comprising a base, a master element having a non-axial surface inclined to the axis thereof, means for rotatably supporting said element on said base, means for supporting a work piece for rotation with said element, ways on said base parallel to the axis of said element, a carriage slidable on said ways, a member fixed on said carriage and engaging said surface, measuring means on said carriage operatively associated with said work piece, and means for moving said carriage in said ways, said measuring means comprising a movable part adapted to engage a surface on said work piece and a device to indicate movement of said member.

5. A comparator comprising a base, a master element having a non-axial surface inclined to the axis thereof, means for rotatably supporting said element on said base, means for supporting a work piece for rotation with said element, ways on said base parallel to the axis of said element, a carriage slidable on said ways, a member fixed on said carriage and engaging said surface, measuring means on said carriage operatively associated with said work piece, and means for moving said carriage in said ways, said last named means comprising a fixed rack on said base and a pinion carried by said carriage and meshing with said rack.

6. A comparator comprising a master element having a non-axial surface inclined to the axis thereof, means for rotatably mounting said element, means for supporting a work piece to be checked for rotation with said element, a member engaging said surface, means for relatively moving said element and member in a direction parallel to the axis of said element to rotate said element and said work piece, and measuring means operatively associated with said work piece and definitely positioned relative to said member for comparing a surface of the work piece with the said surface of the master element, said measuring means comprising a movable member adapted to engage a surface on said work piece and a device to indicate the extent of movement of said movable member.

7. A comparator comprising a master element having a non-axial surface inclined to the axis thereof, means for rotatably mounting said element, means for supporting a work piece to be checked for rotation with said element, a member engaging said surface, means for relatively moving said element and member in a direction parallel to the axis of said element to rotate said element and said work piece, and measuring means operatively associated with said work piece and movable with said member for comparing a surface of the work piece with the said surface of the master element, said measuring means comprising a lever adapted to engage a surface on said work piece and a device to indicate the extent of movement of said lever.

8. A comparator comprising a master element having a non-axial surface inclined to the axis thereof, means for rotatably mounting said element, means for supporting a work piece to be checked for rotation with said element, a member engaging said surface, means for relatively moving said element and member in a direction parallel to the axis of said element to rotate said element and said work piece, and measuring means operatively associated with said work piece and movable with said member for comparing a surface of the work piece with the said surface of the master element, said measuring means comprising a bell crank, one arm of said crank adapted to engage a surface of said work piece, and a device for indicating the extent of movement of the other arm of said crank.

9. A comparator comprising a master element having a non-axial surface inclined to the axis thereof, means for rotatably mounting said element, means for suporting a work piece to be checked for rotation with said element, a member engaging said surface, means for relatively moving said element and member in a direction parallel to the axis of said element to rotate said element and said work piece, and measuring means operatively associated with said work piece and movable with said member for comparing a surface of the work piece with the said surface of the master element, said measuring means comprising a bell crank, one arm of said crank adapted to engage a surface of said work piece, and a device for indicating the extent of movement of the other arm of said crank, said measuring means being adjustable about an axis perpendicular to the axis of said work piece to position the axis of said bell crank substantially parallel to the surface being compared.

10. Means for measuring the inclination of the tooth surface of a gear comprising means for mounting said gear for rotation, a master element having an inclined surface to which the tooth surface is to be compared, said element fixed to said gear for rotation therewith, a carriage mounted for movement parallel to the axis of said gear and element, a pair of members on said carriage and respectively engaging the said surfaces, one of said members being rigid and engaging the surface of said master element, the other member being movable, and means for measuring movement of said last mentioned element.

11. A comparator comprising a support, a pair of centers adjustable toward and away from each other to accommodate a pair of elements to be compared, a pedestal adjustable toward and away from said centers, a carriage movable on said pedestal parallel to the axis of said centers, a contact element carried by said carriage and adapted to engage a surface of one of said pair of elements, an indicator support adjustable on said carriage toward and away from said contact element, an indicator mounting on said indicator support, a movable measuring pointer carried by said mounting, and an indicator adapted to be actuated by said measuring pointer.

12. A comparator comprising a support, a pair of centers adjustable toward and away from each other to accommodate a pair of members having surfaces to be compared, a pedestal adjustable toward and away from said centers, a carriage movable on said pedestal parallel to the axis of said centers, a contact element carried by said carriage and adapted to engage a surface of one of said pair of members and adjustable on said carriage toward and away from said one member, an indicator support adjustable on said carriage toward and away from said contact element, an indicator mounting on said indicator support adjustable on said support toward and away from said other member, a movable measuring pointer carried by said mounting, and an indicator adapted to be actuated by said measuring pointer.

13. In a comparator, a carriage, a contact element on said carriage, ways on said carriage, an indicator support on said carriage mounted in said ways for adjustment toward and from said contact element, an indicator mounting adjustably carried by said indicator support, clamping means for rigidly retaining said indicator support in adjusted position on said ways, and for simultaneously rigidly retaining said indicator mounting in adjusted position in said indicator support.

14. In a comparator, a carriage, a contact element on said carriage, ways on said carriage, an indicator support on said carriage mounted in said ways for adjustment toward and from said contact element, an indicator mounting adjustably caried by said indicator support, clamping means for rigidly retaining said indicator support in adjusted position on said ways, and for simultaneously rigidly retaining said indicator mounting in adjusted position in said indicator support, and yieldable means effective only on release of said clamping means for retaining said indicator mounting against accidental displacement.

15. A comparator comprising a rotatable master element provided with a peripheral slot extending axially thereof, means for mounting said element for rotation, means for supporting a slotted work piece to be checked for rotation with said element, a member extending into the slot of said master element and engageable with either side of said slot, means for relatively translating said element and member in a direction parallel to the axis of said element, and measuring means having a part extending into the slot of said work piece, said member having more clearance in its slot than said part.

16. A comparator comprising a rotatable master element provided with a peripheral slot extending axially thereof, said slot being of tapered cross-section, means for mounting said element for rotation, means for supporting a slotted work piece to be checked for rotation with said element, a member extending into the slot of said master element and engageable with either side of said slot, means for relatively translating said element and member in a direction parallel to the axis of said element, and measuring means having a part extending into the slot of said work piece, said member being independently adjustable toward and from said element to vary its clearance in said tapered slot.

17. Apparatus for comparing the surface of a work piece with a similar surface on a master element which comprises means for mounting said work piece and master element for rotation in axially spaced relation, said work piece and element being locked together for simultaneous rotation, means mounting a pair of supports spaced apart by the amount of axial spacing of said work piece and master element, a finger rigidly carried by one of said supports and adapted to engage one of said surfaces, a finger movably carried by said other support and adapted to engage said other surface, a measuring device to measure movement of said movable finger, and drive means for relatively moving said first two means in a direction parallel to the axis of rotation of said master element and work piece.

WALTER S. PRAEG.